No. 644,996. Patented Mar. 6, 1900.
J. W. MOORE & J. A. WHITE.
MECHANICAL MOVEMENT.
(Application filed Dec. 6, 1898.)
(No Model.)
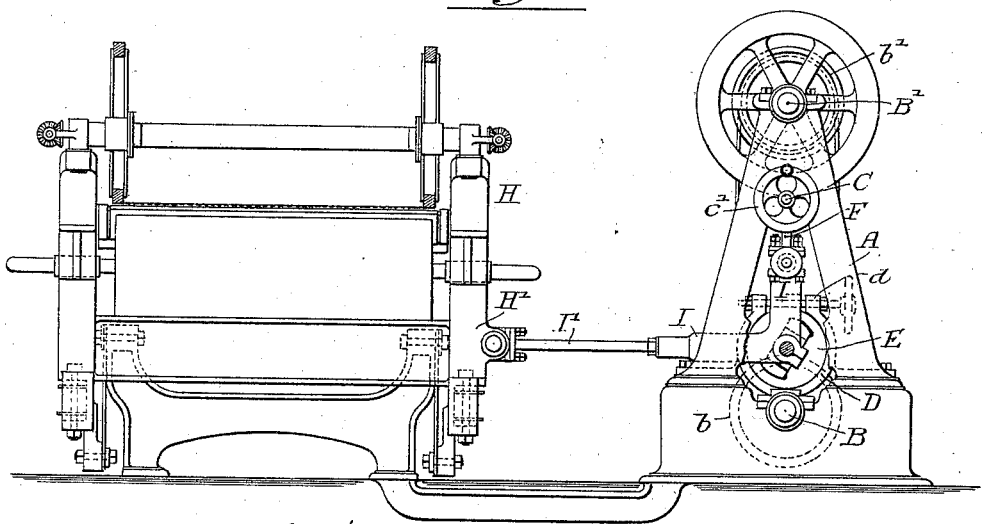
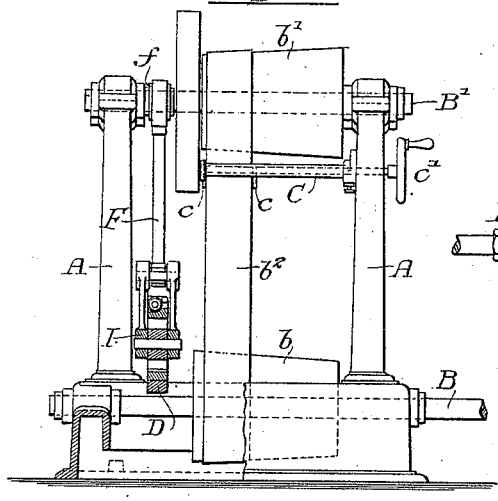
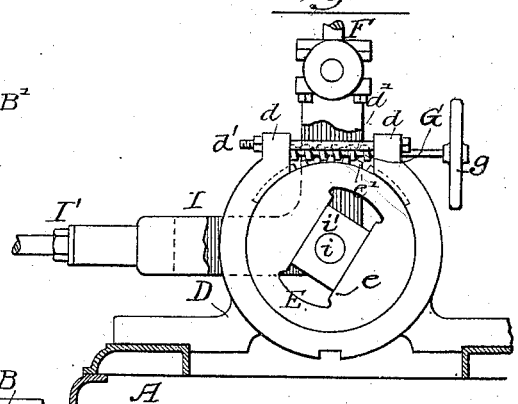
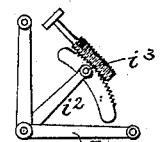
Witnesses:—
Louis M. Hohlhead.
Wm. A. Barr.
Inventors:—
John Warren Moore, &
Joseph Atwood White.
by their Attorneys:—
Howson & Howson

UNITED STATES PATENT OFFICE.

JOHN WARREN MOORE AND JOSEPH ATWOOD WHITE, OF PHILADELPHIA, PENNSYLVANIA.

MECHANICAL MOVEMENT.

SPECIFICATION forming part of Letters Patent No. 644,996, dated March 6, 1900.

Original application filed March 30, 1896, Serial No. 585,522. Renewed November 12, 1898, Serial No. 696,315. Divided and this application filed December 6, 1898. Serial No. 698,461. (No model.)

*To all whom it may concern:*

Be it known that we, JOHN WARREN MOORE and JOSEPH ATWOOD WHITE, citizens of the United States, and residents of Philadelphia, Pennsylvania, have invented certain Improvements in Mechanical Movements, of which the following is a specification.

Our invention relates to certain improvements in mechanism for converting a rotary motion into a reciprocating motion.

The main object of our invention is to regulate the reciprocating motion of the mechanism without stopping the machine and to combine with this mechanism means for increasing or diminishing the speed of the machine.

In the accompanying drawings, Figure 1 is a side view of mechanism for vibrating the shake-frame of a Fourdrinier paper-making machine, illustrating our improvement. Fig. 2 is a front view of the mechanism shown in Fig. 1. Fig. 3 is an enlarged sectional view of a portion of Fig. 1, and Fig. 4 is a view of a modification.

While our invention is especially adapted to vibrate the shake-frame of a Fourdrinier paper-making machine, it can be used in many other instances where a rapid vibration is desired.

A is the frame of the machine, supporting the driving-shaft B and driven shaft B'. On the shaft B is a cone-pulley $b$, and on the shaft B' is a cone-pulley $b'$ in a reversed position in respect to the pulley $b$, and adapted to the pulleys is a belt $b^2$.

C is a belt-shifter having arms $c\ c$ engaging the belt $b^2$ and operated by a handled screw-shaft $c'$. When it is wished to increase or decrease the speed of the driven shaft B', the screw-shaft $c'$ is turned in one direction or the other, so as to shift the belt on the cone-pulleys. On the shaft B' is an eccentric $f$.

F is an eccentric-rod having a strap adapted to the eccentric $f$. This rod is connected to a link I, which in the present instance is forked and shaped as shown in the drawings. The link has an extension I' connected to the mechanism to be operated, in the present instance the shake-frame H' of a paper-making machine H. The two arms of the link I are at right angles to one another. On the link is a pin $i$, carrying a block $i'$, adapted to a slot in a guide-block E. This guide-block is mounted in a bearing D, secured in the present instance to the frame A of the machine.

The block E can be adjusted in the bearing D, so as to increase or diminish the lateral reciprocating motion of the link I. This is accomplished in the present instance by a worm or screw G, engaging with teeth $e'$ on the periphery of the block E. This worm has a suitable hand-wheel $g$, by which it is turned, so that on turning the worm in one direction the block is shifted so that its slot $e$ will be in the extreme oblique position and when turned in the opposite direction the block will be shifted in such a position that there is no perceptible lateral reciprocating movement of the rod I'. The block can be secured in the position to which it was adjusted by drawing the two segmental portions $d\ d$ of the bearing D tightly on the block by means of the clamp-screw $d'$.

If the block E is set in the position shown in Fig. 3, it will be seen that the slide when raised by the cam will also have a certain amount of lateral motion, which will be imparted to the link I and its rod I' and to the mechanism to be vibrated. By adjusting the guide E the lateral vibration of the link I will be increased or diminished. By this means a very neat and accurate adjustment of a reciprocating device can be made, and the speed and be regulated by adjusting the belt on the cone-pulleys.

We have shown in Fig. 1 the rod I' connected to a shake-frame H' of a paper-making machine H, the details of which are fully set forth and claimed in the patent granted to us on February 28, 1899, No. 620,548, of which this application is a division. A shake-frame requires a positive vibration of a certain number of strokes per minute of a given length, according to the quality and character of the paper being made. By the above-described mechanism the adjustments can be readily made without stopping the machine.

It will be understood that we do not limit ourselves to the precise mechanism shown in Figs. 1, 2, and 3, as the link may be made in different forms, depending upon the location of the mechanism in respect to the device to be vibrated.

In Fig. 4 we have shown a modification in which a link $i^2$ has been substituted for the block $i'$ and means for shifting the fulcrum $i^3$ of the link, so that the movement of the link $I^2$ will be dependent upon the position of the fulcrum $i^3$ of the link $i^2$.

We claim as our invention—

1. The combination in a mechanical movement, of a bearing having two segmental portions, a slotted circular guide adapted to the bearing, a block in the guide, a link secured to the block, means for imparting a lateral movement to the link, and means for drawing the segmental portions of the bearing toward each other, whereby the guide is held rigidly in its adjusted position, substantially as described.

2. The combination of a bearing having two segmental portions, a slotted circular guide adapted to the bearing, means for clamping the guide to the bearing, a block mounted in the slotted guide, a link to which the block is pivoted, the two arms of the link being at right angles to one another, mechanism for imparting motion to the link, and an extension on the link to which is attached the mechanism to be vibrated, substantially as described.

3. The combination of a bearing, a slotted guide adapted to the bearing, means for adjusting the slotted guide in the bearing, a right-angled link, with eccentric mechanism connected to one arm of the link, the other arm of the link being connected to the mechanism to be vibrated, substantially as described.

4. The combination of a bearing, a slotted guide adapted to said bearing, means for adjusting the guide in the bearing, a forked link extending on each side of the bearing, a block adapted to the slot in the guide, a pivot-pin secured to the forked link and passing through the block, means for imparting lateral motion to the link, and an extension on the link connected to the mechanism to be vibrated, substantially as described.

5. The combination of a bearing, a slotted circular guide adapted to the bearing, a screw or worm for moving the guide circumferentially in the bearing, means for clamping the guide in the bearing, a link having a block adapted to the guide, and means for imparting movement to the link, substantially as described.

6. The combination of a bearing, a slotted circular guide adapted to the bearing, means for adjusting the guide in the bearing and means for clamping the bearing to the guide, a link, a block carried by the link adapted to the slotted guide, a driven shaft, an eccentric on the driven shaft, an eccentric-rod connected to the link by which a lateral motion is given to said link, an extension on the link connected to the mechanism to be vibrated, and means for increasing or decreasing the speed of the driven shaft, substantially as described.

In testimony whereof we have signed our names to this specification in the presence of two subscribing witnesses.

JOHN WARREN MOORE.
JOSEPH ATWOOD WHITE.

Witnesses:
WILL. A. BARR,
JOS. H. KLEIN.